US008871666B2

(12) United States Patent
Romé et al.

(10) Patent No.: US 8,871,666 B2
(45) Date of Patent: Oct. 28, 2014

(54) METHOD OF PREPARING AN EASILY-DISPERSED RHEOLOGY-GRADE PRODUCT FROM A PSEUDOLAMINAR SILICATE, PRODUCT THUS OBTAINED AND METHODS OF USING SAME

(75) Inventors: Julio Santarén Romé, Madrid (ES); Eduardo Aguilar Díez, Madrid (ES); Antonio Álvarez Berenguer, Madrid (ES); Juan José Aragón Martínez, Madrid (ES)

(73) Assignee: Tolsa, S.A., Madrid (ES)

( * ) Notice: Subject to any disclaimer, the term of this patent is extended or adjusted under 35 U.S.C. 154(b) by 981 days.

(21) Appl. No.: 11/444,907

(22) Filed: Jun. 1, 2006

(65) Prior Publication Data
US 2006/0287191 A1   Dec. 21, 2006

Related U.S. Application Data (63) Continuation of application No. PCT/ES2004/000490, filed on Nov. 4, 2004.

(30) Foreign Application Priority Data

Dec. 3, 2003 (ES) .................. P200302846

(51) Int. Cl.
| | |
|---|---|
| B01J 29/04 | (2006.01) |
| B01J 29/87 | (2006.01) |
| B03B 5/60 | (2006.01) |
| B03B 5/64 | (2006.01) |
| B03B 5/66 | (2006.01) |
| B03B 5/62 | (2006.01) |
| C04B 40/00 | (2006.01) |
| C05G 3/00 | (2006.01) |
| C01B 33/38 | (2006.01) |

(52) U.S. Cl.
CPC ............ *C05G 3/007* (2013.01); *C04B 40/0039* (2013.01); *C01B 33/38* (2013.01)
USPC .............................. 502/60; 209/173; 209/161

(58) Field of Classification Search
USPC .......... 502/62, 60; 209/173, 161, 162, 160, 5, 209/45, 166, 488, 468, 486
See application file for complete search history.

(56) References Cited

U.S. PATENT DOCUMENTS 3,050,863 A * 8/1962 Allegrini et al. ................ 34/426
3,372,043 A * 3/1968 Fanselow ...................... 501/150
(Continued)

FOREIGN PATENT DOCUMENTS

| EP | 0 170 299 A2 | 2/1986 | |
| EP | 170299 | * 2/1986 | .............. C01B 33/36 |
| WO | WO 02/00350 A1 | 1/2002 | |

OTHER PUBLICATIONS

"Hosokawa Bepx Micron Dryer Product Particles of Uniform Size, Moisture Content" Oct. 9, 2002.*

(Continued)

*Primary Examiner* — Shuangyi Abu Ali
(74) *Attorney, Agent, or Firm* — Klauber & Jackson LLC (57) ABSTRACT

The invention relates to a method of preparing a rheology product from a pseudomlaminar silicate comprising microfiber bundles. The inventive method comprises the following steps consisting in: grinding the pseudolaminar silicate mineral which is selected from sepiolite mineral, attapulgite mineral and combinations of same, with a pseudolaminar silicate concentration of at least 50%, moisture of less than 40% and a particle size of less than 1 mm; mixing the ground pseudolaminar silicate mineral with an aqueous solution of a dispersing component comprising at least one dispersing agent, in order to obtain a first mixture comprising between 35% and 85% water and between 0.1% and 7% dispersant in relation to the weight of the pseudolaminar silicate mineral; and intensively mixing the first mixture obtained in the second step until the dispersion of the pseudolaminar silicate microfibre bundles in order to obtain the rheology product in a dispersion homogeneously mixed with the dispersant and the water.

17 Claims, 1 Drawing Sheet

(56) References Cited

U.S. PATENT DOCUMENTS

| | | | |
|---|---|---|---|
| 3,399,068 A * | 8/1968 | Horton | 501/149 |
| 3,539,003 A * | 11/1970 | Bidwell | 209/5 |
| 3,596,760 A * | 8/1971 | Jacobs et al. | 209/45 |
| 4,182,785 A * | 1/1980 | Price | 427/361 |
| 4,334,985 A * | 6/1982 | Turner, Jr. | 209/5 |
| 5,049,532 A * | 9/1991 | Brooks et al. | 501/148 |
| 6,130,179 A * | 10/2000 | Sampson et al. | 502/62 |
| 6,444,601 B1 * | 9/2002 | Purcell et al. | 502/62 |
| 6,596,803 B2 * | 7/2003 | Lan et al. | 524/445 |
| 6,662,951 B1 * | 12/2003 | Fellers | 209/158 |
| 6,828,370 B2 * | 12/2004 | Lan et al. | 524/445 |
| 6,918,991 B2 * | 7/2005 | Chickering et al. | 159/48.1 |
| 2003/0027872 A1 | 2/2003 | Chaiko | |

OTHER PUBLICATIONS

ITC Minerals in Chemicals, MIN-U-GEL LF, Suspending Agent for Liquid Feed Supplements, pp. 2-8, Hunt Valley, Maryland (1999).

ITC Minerals in Chemicals, MIN-U-GEL 200, Suspension Clay, pp. 1-4, Hunt Valley, Maryland (1999).

ITC Minerals in Chemicals, MIN-U-GEL 200, in N-P-K Fertilizer Binding Systems, Hunt Valley, MD (1999).

ITC Minerals in Chemicals, The Productioin and Use of Liquid Clay, pp. 1-8, Hunt Valley, Maryland (1999).

J.R. Wolford et al, Preparation and Application of Fluid Lime Suspensions for Soil Neutralization.

Hubert L. Balay et al, Before You Gear Up to Handle Fluid Lime, Custom Applicator, pp. 58-61e, Mar. 1981.

Edgar W. Sawyer, Use of Gelling Clays to Stabilize Agricultural Pesticide Suspensions and Emulsions in Aqueous Sytems, Special Technical Publication 943, pp. 177-186.

Haden, Jr. et al, Attapulgite, its Properties and Application, Industrial and Engineering Chemicstry, vol. 59, No. 9, pp. 59-69 (1967).

Cao, E, et al., An electron-microscopic study of Na-attapulgite particles; 1998, Collord & Polymer Science.; vol. 276: pp. 842-846.

* cited by examiner

METHOD OF PREPARING AN EASILY-DISPERSED RHEOLOGY-GRADE PRODUCT FROM A PSEUDOLAMINAR SILICATE, PRODUCT THUS OBTAINED AND METHODS OF USING SAME

RELATED APPLICATION

The present application is a continuation of Co-pending PCT Application No. PCT/ES2004/000490, filed on Nov. 4, 2004, which in turn, claims priority from Spanish Application Serial No. 200302846, filed on Dec. 3, 2003. Applicants claim the benefits of 35 USC §120 as to the PCT application, and priority under 35 USC §119 as to the said Spanish Application, and the entire disclosures of both applications are incorporated herein in their entireties.

TECHNICAL FIELD OF THE INVENTION

The present invention comes within the sector of rheological additives, suspension agents and thickeners, particularly within rheological additives based on special clays from the sepiolite-palygorskite group.

STATE OF THE PRIOR ART OF THE INVENTION

Special clays, both those belonging to laminar phylosilicates such as montmorillonite and hectorite, and those belonging to pseudolaminar silicates such as sepiolite and attapulgite, are used as rheological additives due to their capacity to modify the rheological or flow behaviour of different liquid systems when they are added in relatively small quantities. In this way, these clays are used as thickeners to increase the viscosity of the system, as suspension agents to prevent the settling of particles in suspension in the system, and as additives which provide a particular rheological behaviour, such as for example pseudoplasticity (decrease in viscosity with shear velocity) or thixotropy (increase in viscosity with shear time, for a constant shear velocity).

The capacity of these clays for acting as rheological additives derives from the colloidal size of their particles, their shape and the structure which these particles can form in the liquid component of the system to which they are added. So, particles of phyllosilicates such as montmorillonite and hectorite have a laminar form with a negative residual charge on the faces of the laminas coming from the isomorph substitutions within the structure. This negative charge is compensated by absorbing cations which are retained by electrostatic forces and can be exchanged with other cations, because of which they are known as exchange cations.

The laminar particles of these phyllosilicates are arranged stacked with the exchange cations occupying the spaces in between the laminas or interlaminar space and the external faces. When the particles of clay formed by these stackings of laminar particles are dispersed in water, the water can to a greater or lesser degree, depending on the exchange cation, penetrate the interlaminar space producing the spontaneous separation of the laminar particles.

If the cation is $Na^+$, the water can spontaneously penetrate between the laminas and produce spontaneous swelling of the particles of montmorillonite and the easy dispersion of this clay in water with a minimum of mechanical stirring. Once the clay is dispersed into its individual particles, these can form a structure within the liquid similar to a house of cards, which is stabilised by attractive electrostatic forces between the faces of the negatively charged laminas and the positively charged edges.

If, on the other hand, the exchange cation is $Ca^{2+}$, the greater density of positive charge of this cation keeps the laminas of montmorillonite bonded together more strongly and the spontaneous separation of particles of montmorillonite in water does not take place. So, in the case of calcium montmorillonite, instead of individual laminar particles as occurs with sodium montmorillonite, it has stackings of laminar particles joined by a variable number of laminar particles, bonded together by $Ca^{2+}$ cations. This means that the number of individual particles that can participate in order to form the "house of cards" structure within the liquid is substantially less in the case of calcium montmorillonites than with sodium montmorillonites or bentonites for the same weight of clay, and therefore their effectiveness as a rheological additives is substantially reduced. For that reason, sodium montmorillonites are normally used as rheological additives or, in the case of calcium montmorillonites, a prior exchange of calcium cations for sodium ones is made with the aim of improving their rheological characteristics.

Moreover, clays normally appear contaminated with other minerals, such as feldspars, quartz, carbonates such as calcite and dolomite, etc. These mineral contaminants, which in some cases can imply a substantial percentage, do not have the colloidal properties of clays and they dilute the behaviour of the latter as a rheological additive. Also, these other minerals normally have other undesirable characteristics such as a much larger particle size than in clays and greater hardness, which makes them undesirable in many applications in which clays are used as a rheological additive, such as for example in paints. So, the clays are normally subjected to purification processes with the aim of eliminating these mineral impurities which, as well as avoiding the problems mentioned, also improve the properties as a rheological additive due to the elimination of these components which dilute the effect of the clay.

Another type of clay that is particularly commonly used as a rheological additive is sepiolite and attapulgite. These two clays belong to the group of pseudolaminar silicates characterised in that the shape of their particles is not laminar but instead acicular, in the form of microfibres with an average length of 1 to 2 μm, and which, in the case of sepiolite, is found for example in the Vallecas-Vicálvaro deposit (Madrid, Spain) and in the case of attapulgite in, for example, the United States. These particles also have a degree of isomorph substitution within their structure that is much less than in the case of montmorillonite, with which their surface charge is less and their cation exchange capacity is much less, of the order of 10 to 20 meq/100 g, compared to a typical value of 100 meq/100 g for montmorillonite. Consequently, sepiolite and attapulgite do not spontaneously swell up in water like montmorillonite. For that reason, the acicular particles of sepiolite and attapulgite appear in nature forming large agglomerates or bundles of microfibrous particles which need to be subjected to dispersion processes by applying mechanical energy and using high shear to manage to deagglomerate the bundles into their individual particles.

The use of dispersants has been described for dispersing clays and purifying them of mineral contaminants. For example, patent application WO 02/00350 describes that it is possible to disperse particles of attapulgite and other clays using dispersants such as TSPP, in order to obtain a rheological product of attapulgite. Nevertheless, the same patent application WO 02/00350 indicates that, in spite of the fact that these dispersants disperse the particles of clays other than attapulgite, these other clays, among which are mentioned montmorillonite, smectite and sepiolite, do not have the same rheological characteristics as attapulgite and therefore they are negative for the effectiveness of the product obtained with attapulgite. So, patent application WO 02/00350 describes a purification method using polyacrylate as dispersant with a molecular weight of between 4,000 and 5,000 in order to selectively disperse the attapulgite and be able to separate not just the non-clay contaminants but also other clays than attapulgite, such as sepiolite, which are not effective as rheological additives when they are processed using dispersants in accordance with the methods described so far. The patent application EP-A-170.299 similarly describes the use of dispersants for purifying sepiolite of mineral contaminants by preparing a suspension of sepiolite in water with a concentration of solids of 5% to 25% and then eliminating the contaminants by means of centrifugation or settling. In this case a flocculant needs to be added later on prior to the stage of filtration or solid/liquid separation.

The patent application EP-A-0170299 describes a method for obtaining a rheological grade product of sepiolite based on a process of damp micronisation and which permits particles of sepiolite to be obtained with a size of less than 10 µm, carrying out a grinding and a sorting in the damp state, using hydrocyclones, for example. This damp grinding process permits the bundles to be deagglomerated and free acicular particles to be obtained without affecting their "aspect ratio", in other words their length/diameter ratio, which is essential for their effectiveness as a rheological additive. The stage of sorting by particle size, as well as separating the un-deagglomerated bundles, also permits the elimination of contamination from other minerals, such as calcite, dolomite, quartz, feldspar, etc. This process is very costly because it requires working with suspensions with a low concentration of solids (less than 10%) in order to permit sorting with hydrocyclones, owing to the high viscosity obtained in the pulp. Also, the process is very costly in energy terms because the damp grinding stage is carried out with a pulp with a low concentration of solids, and then a solid/liquid separation has to be performed in order to separate the micronised clay from the diluted suspension.

This raises difficulties due to the low filtrability of clay pulps which leads to very long filtration cycles using press filters. Filtration cakes are obtained with a very high residual moisture, up to 55%, which entail high energy costs for drying. In short, the process described in patent application EP-A-170299 is a very costly one.

Although the concentration of clay suspensions can be increased using dispersants which reduce the viscosity of the suspension and permit sorting to be carried out with hydrocyclones with a greater concentration in solids, there is a limit to the maximum concentration of pulp for being able to carry out sorting in the hydrocyclones. Also, the later problems of filtration and drying still remain, and a flocculant needs to be used in order to be able to filter the suspension and separate the clay. The use of dispersants in order to reduce the viscosity of the clay pulps and permit purification of the clay by eliminating contaminants of other minerals and also the elimination of agglomerate particles of clay with the aim of obtaining a product with a fine and controlled particle size, has been described and is known in the state of the art. For example, patents U.S. Pat. No. 3,399,068 and U.S. Pat. No. 3,596,760 describe the use of dispersants such as TSPP and NaOH for the purification of attapulgite of contaminants and in patent application EP-A-170.299 the use is described of dispersants such as sodium hexametaphosphates and TSPP for the purification of sepiolite. Patent application WO 02/00350 also describes the use of sodium polyacrylate with a molecular weight of between 4,000 and 5,000 for dispersing the attapulgite and purifying it by eliminating other clays and contaminant minerals.

DESCRIPTION OF THE INVENTION

The objective of the present invention is to obtain a rheology-grade product of pseudolaminar silicates selected from between sepiolite, attapulgite and combinations thereof, by means of a method that uses dispersants, which is much simpler and less costly than the current methods of damp micronisation of these clays, and which permits products to be obtained with an effectiveness as a rheological additive that is equal or better in most industrial applications in which this type of product is used.

In order to achieve this objective, the present invention makes use of dispersants, not for purifying the clay of the pseudolaminar silicate, but instead mixed intensively with that silicate in the form of a pulp or paste for obtaining a rheology-grade product of sepiolite and/or attapulgite which does not require the use of damp micronisation processes with a low concentration of solids as described in patent application EP-A-170.299 and which, therefore, implies a simplification of the process and an appreciable reduction in its cost. Likewise, the present inventive method permits products to be obtained of equal or greater effectiveness as rheological additives (thickeners or suspension agents) in high ionic force media.

The present inventive method comprises the following stages: in the first stage a clay from the group of sepiolite and/or attapulgite, with a sepiolite and/or attapulgite content of at least 50%, is ground by means of any conventional grinding method to a particle size of below 1 mm and preferably 150 µm.

The clay is then mixed with water in an intensive mixer together with a dispersing component consisting of one or several dispersing agents.

The water content of the mixture can vary between 35% and 85% of the weight of clay, and preferably between 45% and 80%. As dispersing agents, polyelectrolytes or charged polymers can be used which are adsorbed on the surface of the clay and produce the electrostatic repulsion of the clay particles. Some examples of these dispersants are polyphosphoric acids and their salts such as sodium hexametaphosphate, tetrasodium pyrophosphates, sodium polyacrylate of low molecular weight, preferably below 6,000 and more preferably between 2,000 and 5,000, phosphonic and phosphinic derivatives such as diphosphonic acids and their salts, and also salts of phosphonic acids. The derivatives of phosphonic acids have the advantage of being more stable to hydrolysis than inorganic polyphosphates.

Also able to be used as dispersing agents are bases such as sodium, ammonium and potassium hydroxide, sodium carbonate, etc., which increase the pH to above 9, which produces the adsorption of $OH^-$ groups on the surface of the clay or the ionisation of silanol groups present on the surface of the clay and also the electrostatic repulsion of the particles.

The addition percentage of the dispersing component consisting of the dispersing agent or agents can vary between 0.1% and 7% of the weight of clay, and preferably between 0.3% and 6%. When several dispersing agents are used, the total proportion of them also lies within these ranges.

In an advantageous embodiment of the invention, a dispersing component is used consisting of a first dispersing agent corresponding to a base, for example, sodium hydroxide, ammonium hydroxide and/or potassium hydroxide, capable of increasing the pH of the paste containing the pseudolaminar silicate mineral, dispersing agents and water to a pH of above 9, together with a second dispersing agent corresponding to at least one inorganic polyelectrolyte like those stated above, which are mixed with water and at least one pseudolaminar silicate.

The clay is preferably dispersed in the aqueous solution of the dispersing component in water, though the clay and water can also be mixed together and then the dispersing component is added, or the clay and the dispersing component are mixed and then water is added. The mixture of clay, water and dispersing component is done using a mixing system which permits the resulting mixture of clay in water to be homogenised, intensive mixers or turbomixers being particularly effective, such as double sigma mixers or plough shaped rotor mixers of the Lödige type. Under these conditions, the dispersing component and the internal shear produced by the rubbing between particles produces an intensive deagglomeration of the individual particles of the pseudolaminar silicate, which is important for producing a product with rheological properties.

Afterwards, the mixture of water, pseudolaminar silicate and dispersing component can be treated depending on the concentration of pseudolaminar silicate and water. When the concentration of pseudolaminar silicate is between 15% and 35%, and that of water is between 85% and 65%, with a concentration of dispersing component of 0.1% and 7% of the weight of silicate, the resulting mixture has the appearance of a fluid pulp with variable viscosity, depending on the content of silicate and dispersing component, which is stable and does not settle. This fluid pulp can be used directly as the final product, as a rheological additive in various applications, since when this pulp is added to liquid systems with charges or dissolved salts, the pseudolaminar silicate pulp produces an increase in the viscosity of the liquid system and provides it with a pseudoplastic and/or thixotropic rheological behaviour, improving its stability and the homogeneity of the different components. In pulp form, this product works especially well as a rheological additive for direct addition in construction formulations such as filling mortars, damp sprayed concrete, injected mortar or gunite for swimming pools. This product in pulp form produces a rapid increase in consistency, it grants thixotropic properties, reduces the rebound in the case of sprayed concrete, it prevents unsticking, improves the finish, avoids exudation, improves pumpability, etc.

When the concentration of pseudolaminar silicate is between 65% and 35%, that of water between 35% and 65%, and the dispersing component is between 0.1% and 7% of the weight of silicate, a non-fluid mixture is obtained with a pasty appearance. The pseudolaminar silicate paste is dried, normally to a moisture content of less than 20%, and usually below 12%, and is ground to the final size required by the application.

The drying process of the pseudolaminar silicate paste, water and dispersing component can be done by any of the usual methods in industry, using for example fluid bed drying equipment. In turn, the grinding is done by means of the usual grinding equipment for minerals, preferably employing impact mills using hammers or spikes. After that, a granulometric sorting is carried out in order to obtain the desired particle size.

Instead of carrying out the drying and grinding sequentially, it is preferable to do it simultaneously using "flash-dryer" equipment, such as the Micron Flash Dryer manufactured by Micron Hosokawa which permits drying, grinding and sorting of the final product to be carried out in a single operation.

It is preferred for the final product to have a dry granulometry of less than 250 μm and normally below 44 μm. Although this dry granulometry is fairly thick, the final granulometry once the rheolgical product has been dispersed in water is much less, and under these conditions more than 80% of the particles habitually have a size of less than 44 μm and more than 75% of the particles have a size of less than 5 μm.

Having a thicker dry granulometry is beneficial because it increases the apparent density of the product in powder form and therefore the product is cheaper to transport. Moreover, a bulkier dry product generates less ambient dust during handling, which is also an advantage.

The products obtained according to this method starting from silicate paste, water and dispersing component, and especially rheology-grade sepiolite, are easily dispersed in water using a low shear and they produce dispersions with a relatively low viscosity in electrolyte-free water but nevertheless they easily recover their viscosity when there are electrolytes present, in other words when the ionic force is increased. Under these conditions, the cations present in the medium act as bridges between the negatively charged clay particles due to the effect of the dispersing component and they permit the formation of a structure of clay particles in the liquid medium, and so the viscosity increases. This effect also takes place in the presence of other charges and pigments which can be adsorbed by the particles of pseudolaminar silicate, and especially of rheological sepiolite, and it also permits recovery of a structure in the medium formed by the particles of other charges and the rheological pseudolaminar silicate.

The products of pseudolaminar silicate and, in particular, of sepiolite, obtained by the present inventive method are normally more effective than those produced by the process described in patent application EP-A-170.299, in spite of the fact that the process is simpler and cheaper because they do not require any damp micronisation process using a low concentration pulp, which then afterwards requires a stage of solid/liquid separation with press filters in order to increase the concentration of the pulp in solids from 3% up to 45% followed by a drying stage in order to reduce the moisture content from 55% to <10%.

In the method described in this specification, either a pulp is obtained which is used as the final product without any need to perform a solid/liquid separation, or a paste is obtained, with a typical moisture content of 45%, which can be dried directly thereby doing away with the need for a costly solid/liquid separation stage, drastically reducing the water consumption and reducing the energy cost due to cutting down on the amount of water that needs to be evaporated.

In spite of the process being simpler, the characteristics of the product obtained in this process as rheological additive in high ionic force mediums or charged mediums are equal or better than those obtained in accordance with patent application EP-A-170.299, and also it disperses better using low shear equipment.

The high efficiency of the pseudolaminar silicate and, particularly, of the sepiolite obtained according to this method when used as a rheological additive is surprising and unexpected.

So, and in spite of the teachings of the state of the art relating to the fact that the use of dispersing components does not permit sepiolite particles to be dispersed adequately and a rheological product to be obtained based on sepiolite, it has been found that when the sepiolite is submitted to the present inventive method using dispersants it is possible to obtain a rheological product that is even more effective than the product obtained in accordance with other processes described in the state of the art (patent application EP-A-170.299).

The above is also true for attapulgite.

The key stage in this process is the mixing of the pseudolaminar silicate with at least one dispersing component, especially in additions of 0.1% to 7%, and preferably from 0.3% to 6%, in order to form a mixture in water with a water content of from 35% to 85% and preferably between 45% and 80%, using a system of intensive mixing. Under these conditions, the combination of chemical dispersing component and the internal shear produced by the friction between particles leads to a deagglomeration of the individual particles of the pseudolaminar silicate without affecting the aspect ratio or length/diameter ratio of the elemental particles. This effect is achieved using dispersants either of the polyelectrolyte or of the charged polymer type as bases which increase the pH above 9 and ionize the silanol groups located on the surface of the sepiolite. The combination of the dispersing component or components together with the internal shear which is achieved during the mixing of the paste with a high concentration of clay from 35% to 85%, and preferably between 45% and 80%, produces a much more effective deagglomeration than that obtained using high shear equipment but pulps with lower clay concentrations as described in patent application EP-A-170.299. For that reason, the products obtained in accordance with the present inventive method are much more effective as rheological additives in charged media or in the presence of electrolytes than the products described in patent application EP-A-170.299. This greater effectiveness, which is achieved with the combination of dispersing component/intensive mixing, is unexpected as is shown by the fact that patent application EP-A-170.299 describes the separate use of dispersants for purifying the sepiolite (Process II of the patent application) and an intensive mixture with a high sepiolite concentration, of between 60% and 30% (Process III of the patent application), but it does not describe the joint use of dispersant and intensive mixing because it was not expected to improve the result of these two separate stages.

The products obtained in accordance with the method of the present application can be used as rheological additives in different applications for modifying the rheological behaviour of liquid systems provided there exist charges in dispersion or dissolved salts. Examples of these applications are the use as suspension agent in liquid foods for animal feed, particularly for pigs, as suspension agent for fertilisers in suspension, as rheological additives for construction, mortars, asphalt compositions, etc.

BRIEF DESCRIPTION OF THE FIGURE

As an integral part thereof, the present description includes a FIGURE showing a comparison of the fluidity index of different feed samples, corresponding to a control sample without rheological additive, a sample with a rheology grade sepiolite prepared in accordance with example 1 of the patent application EP-A-170.299 and a sample with the addition of rheological sepiolite prepared according to the present inventive method.

MODES OF EMBODIMENT OF THE INVENTION

EXAMPLE 1

A sepiolite mineral with a sepiolite purity of 85% and a moisture content of 30% is ground to a particle size with 95% less than 150 μm and 30% less than 44 μm. 64.2 parts by weight of this ground sepiolite are then mixed with 35.7 parts by weight of water to which has previously been added 0.63 parts by weight of a 50% solution of NaOH.

The paste that is formed is mixed in a Lödige type turbo-mixer for 6 minutes. During the mixing stage, the joint effect of the dispersant and the internal shear due to friction between particles produces a significant reduction in size, as can be seen in Table 1.

TABLE 1

Granulometry of sepiolite before and after kneading with dispersant

|  | <150 μm (%) | <75 μm (%) | <44 μm (%) |
|---|---|---|---|
| Before kneading | 90.8 | 64.9 | 31.1 |
| After kneading | 96.0 | 87.3 | 81.7 |

The paste formed, which has a sepiolite concentration of 45%, is fed to a flash dryer where it is dried, ground and sorted until a product is obtained with a granulometry when damp with 95% less than 44 μm and 85% less than 5 μm.

The final product obtained is dispersed at a concentration of 6% in water saturated with NaCl, stirring for 10 minutes in a stirrer at 2,700 rpm, and the Brookfield viscosity is determined at 5 rpm.

Table 2 summarises the characteristics of the final product obtained.

TABLE 2

Characteristics of the product obtained in Example 1

| Moisture content (%) | 10.9 |
|---|---|
| <44 μm (%) | 99.1 |
| <5 μm (%) | 86.4 |
| Viscosity in water saturated with NaCl (cP) | 44,600 |

It is important to observe that the viscosity that is obtained in water with electrolytes is 44,600 cP, much higher than the viscosity of 10,000 cP to 34,000 cP which is stated can be obtained when the sepiolite is processed using the process described in patent application EP-A-170.299.

It has to be borne in mind that this high efficiency as a rheological additive is obtained, moreover, without carrying out a purification process in order to eliminate contamination from other minerals, as is done in the process described in patent application EP-A-170.299.

EXAMPLE 2

A process is carried out like that described in Example 1, but in the last stage of drying, grinding and sorting, the sorter is adjusted to different speeds in order to obtain different sizes of final particle.

Table 3 shows the characteristics of the final particles and the viscosity obtained in water saturated with NaCl.

As can be seen, products of different granulometry can be obtained, though they all show good behaviour in mediums with high ionic force.

TABLE 3

Characteristics of the products obtained in Example 2

| Sorting speed (rpm) | Moisture content (%) | Dry granul. <44 μm (%) | Damp granul. <44 μm (%) | Damp granul. <5 μm (%) | Viscosity in water saturated with NaCl (cP) |
|---|---|---|---|---|---|
| 500 | 11.9 | 67.1 | 95.3 | 88.5 | 48,160 |
| 900 | 10.5 | 91.9 | 98.8 | 89.9 | 46,400 |
| 2,000 | 11.5 | 99.99 | 99.99 | 95.3 | 48,293 |

EXAMPLE 3

A sepiolite mineral with a sepiolite purity of 85% and a moisture content of 26% is ground to a particle size with 95% less than 150 μm and 30% less than 44 μm. 65.6 parts by weight of this ground sepiolite are then mixed with 33.6 parts by weight of water to which has previously been added 0.80 parts by weight of a 50% solution of NaOH. The paste formed is mixed in a Lödige type turbomixer for 6 minutes. The paste formed, which has a sepiolite concentration of 45%, is fed to a flash dryer where it is dried, deagglomerated in a controlled manner and sorted until a product is obtained with a granulometry when dry with 99% less than 75 μm and 80% less than 44 μm. The characteristics of this product 1 are shown in Table 4. The process described is repeated for product 1, but this time the solution of NaOH is not previously added to the mixture in the turbomixer. The characteristics of Product 2 obtained are shown in Table 4.

As can be seen, the final viscosity which it is possible to achieve in a solution of water saturated with NaCl is appreciably higher in the case of product 1 obtained with dispersant than in the case of product 2, processed in the same way but without dispersant.

TABLE 4

Characteristics of the products obtained in Example 3
(stirring speed 10,000 rpm for 10 minutes)

| Product | Moisture content (%) | Dry granul. <44 μm (%) | Viscosity in water saturated with NaCl (cP) |
|---|---|---|---|
| 1 (with NaOH) | 9.9 | 80.0 | 52,500 |
| 2 (without NaOH) | 9.9 | 80.6 | 44,200 |

The difference between product 1 and 2 is even more evident if the dispersion in water saturated with NaCl is done under low shear conditions. Table 5 shows the viscosity of products 1 and 2 in water saturated with NaCl using different times and stirring speeds. It can be seen that product 1 obtained with dispersant permits an appreciably higher viscosity to be obtained under conditions of short times and/or low stirring speeds than product 2. The high viscosity obtained with product 1 under low shear conditions shows that this product is dispersed much better than the product without dispersant.

TABLE 5

Viscosity of 6% suspensions of the products obtained in Example 3 in water saturated with NaCl under different stirring conditions

| Stirring speed (rpm) | Stirring time (min) | Viscosity product 1 | Viscosity product 2 |
|---|---|---|---|
| 1,000 | 2 | 37,200 | 17,800 |
| 1,000 | 10 | 32,000 | 24,400 |
| 2,700 | 2 | 38,560 | 32,600 |
| 10,000 | 10 | 52,500 | 44,200 |

EXAMPLE 4

A sepiolite mineral with a sepiolite purity of 85% and a moisture content of 32% is ground to a particle size with 95% less than 150 μm and 30% less than 44 μm.

65.6 parts by weight of this ground sepiolite are then mixed with 33.6 parts by weight of water to which has previously been added 0.80 parts by weight of a 50% solution of NaOH. The paste formed is mixed in a Lödige type turbomixer for 6 minutes. The paste formed, which has a sepiolite concentration of 45%, is fed to a flash dryer where it is dried, deagglomerated in a controlled manner and sorted until a product is obtained with a granulometry when dry of between approximately 850 μm and 75 μm (99% less than 850 μm and 20% less than 75 μm), but with a granulometry when damp, once dispersed in water, with 84.8% less than 44 μm and 78% less than 5 μm. The characteristics of this product are shown in Table 6.

TABLE 6

Characteristics of the products obtained in Example 4

| Moisture content (%) | Dry granul. <44 μm (%) | Damp granul. <44 μm (%) | Damp granul. <5 μm (%) | Viscosity in water saturated with NaCl (cP) |
|---|---|---|---|---|
| 11.1 | 4.0 | 84.8 | 78.0 | 47,300 |

This product is used as a suspension agent in a feed of maize, barley and soya bean used as liquid feed for pigs, once dispersed in water. Owing to the thick particle size of this feed, there is a considerable tendency towards sedimentation. In order to prevent this, 1% of sepiolite product of the weight of dry feed is added.

Figure 1:
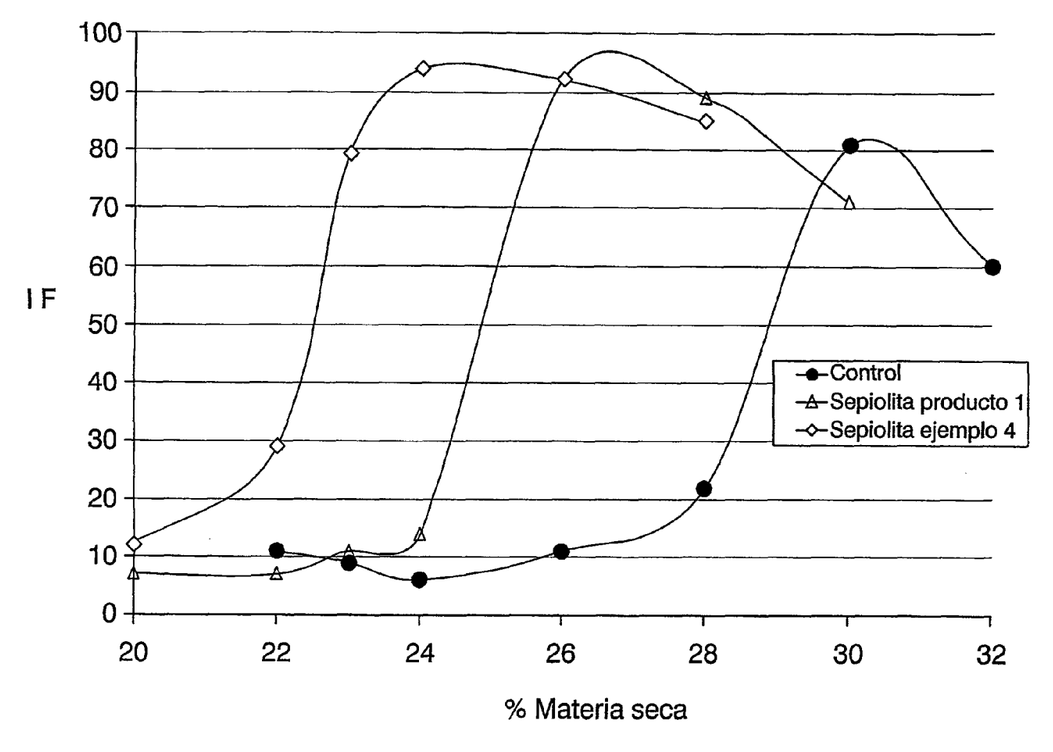

The product obtained in the process of example 3 is compared with a product obtained in accordance with the process described in patent application EP-A-170.299 and known as "Sepiolite product 1". In order to evaluate the sedimentation, the so-called "fluidity index" (FI) is calculated, which is determined by preparing the feed in suspension in water which is poured into a 250 ml test-tube previously rated ($T_1^0$). The full test-tube is weighed ($T_1^1$). It is left to settle for 5 minutes, the syneresis volume or volume of free water remaining as supernatant ($V_S$) is measured, and it is then tilted at an angle of 45° to the horizontal, the feed is left to drain for 1.5 minutes and it is weighed ($T_1^2$). The "fluidity index" (FI) is calculated as:

$$FI = (100(T_1^1 - T_1^2)/(T_1^1 - T_1^0)) - S$$

where $S = 100 (V_S/250)$

The "fluidity index" is a measure of the stability of the dispersion of the feed in water and the higher the FI the better the stability. FIG. 1 shows the FI for different dry materials of the feed in the control without additive, using the product "sepiolite product 1" obtained in accordance with the process without dispersants described in example 1 of the patent application EP-A-170.299. As can be confirmed, the product obtained as described in example 4 permits a much better stability to be obtained for lower dry feed materials.

EXAMPLE 5

A sepiolite mineral with a sepiolite purity of 85% and a moisture content of 30% is ground to a particle size with 95% less than 150 μm and 30% less than 44 μm. 64.2 parts by weight of this ground sepiolite are then mixed with 35.7 parts by weight of water to which has previously been added 0.27 parts by weight of a 50% solution of NaOH. The paste formed is mixed in a Lödige type turbomixer for 6 minutes. The paste formed, which has a sepiolite concentration of 45%, is fed to a flash dryer where it is dried, ground and sorted until a product is obtained with a granulometry when dry with 93% less than 44 μm and with a granulometry when damp, once dispersed in water, with 98% less than 44 μm and 86% less than 5 μm. The final product obtained is dispersed in a 6% concentration of water saturated with NaCl. The characteristics of the product obtained are shown in Table 7.

TABLE 7

Characteristics of the products obtained in Example 5

| Moisture content (%) | Dry granul. <44 μm (%) | Damp granul. <44 μm (%) | Damp granul. <5 μm (%) | Viscosity in water saturated with NaCl (cP) |
|---|---|---|---|---|
| 9.8 | 86.0 | 98.0 | 86.0 | 41,500 |

The product obtained in this example was used as rheological additive in a glue mortar as partial substitute for a cellulose derivative (Tylose 60001) used as a water retainer. The characteristics obtained in the glue mortar are shown in Table 8.

TABLE 8

Composition and characteristics of the glue mortar obtained

| Siliceous glue mortar | (pp) | 1000 | 1000 |
|---|---|---|---|
| Tylose 60001 P4 | (pp) | 2.8 | 2.24 |
| Sepiolite example 5 | (pp) | — | 1.12 |
| Degree of substitution of the Tylose | (%) | 0 | 20 |
| Substitution ratio | (pp) | — | 1:2 |
| Water | (pp) | 240 | 225 |
| Consistency | (mm) | 167 | 170 |
| Adherence at 7 days | (N/mm²) | 1.7 | 1.7 |
| Adherence at 28 days | (N/mm²) | 1.1 | 1.4 |
| Open time 30 min. 7 days | (N/mm²) | 0.8 | 0.8 |
| Open time 30 min. 28 days | (N/mm²) | 0.5 | 0.7 |
| Workability | | Good | Very good |
| Adherence when fresh | | Good | Very good |
| Relative cost of water retainer additive | | 100 | 86 |

It can be confirmed that the joint use of the sepiolite product with the cellulose derivative permits the same values of consistency and resistance to be obtained, improving the workability of the mortar and its adherence when fresh. Also, the partial substitution of the cellulose derivative with the sepiolite product permits the cost of the water retaining system to be significantly lowered.

EXAMPLE 6

The sepiolite product obtained in example 5 was also used in an anionic asphalt emulsion, partially substituting the emulgent used with the aim of improving the stability of the emulsion and reducing its cost.

The formulation used and its characteristics are shown in Table 9.

TABLE 9

Composition and characteristics of the anionic asphalt emulsion obtained

| Bitumen 140/160 Cepsa-Proas | 60 | 58 |
|---|---|---|
| Emulgent Sol. | 40 | 42 |
| Vinsol resin (10%) | 15 | 13 |
| Sepiolite example 5 | 0 | 2 |
| Water | 25 | 27 |
| pH | 12.1 | 11.6 |
| Viscosity at 5 rpm (cP) | 80 | 840 |
| Residue by evaporation (%) | 60 | 59.8 |
| Stability with 0.1 N CaCl$_2$ (%) | 0 | 0 |
| Relative cost of the emulgent system | 100 | 90 |

As can be confirmed, the partial substitution of the emulgent with the sepiolite product permits the viscosity of the emulsion to be increased, which leads to better stability, at the same time as reducing the cost of the emulgent system. Better resistance to water can also be seen and re-emulsification is reduced.

EXAMPLE 7

An attapulgite mineral with an attapulgite purity of 75% and a moisture content of 22% is ground to a particle size with 47% less than 44 microns and 89% less than 150 microns. 53.1 parts by weight of this ground attapulgite are then mixed with 46.9 parts by weight of water to which has previously been added 0.63 parts by weight of a 50% solution of NaOH. The paste formed is mixed in a Lödige type turbomixer for 6 minutes. The paste formed, which has an attapulgite concentration of 45%, is fed to a flash dryer where it is dried, ground and sorted until a product is obtained with a granulometry when dry with 33% less than 44 microns and with a granulometry when damp, once dispersed in water, with 95% less than 44 microns and 88% less than 5 microns. The final product obtained is dispersed in a 6% concentration of water saturated with NaCl. The characteristics of the product obtained are shown in Table 10.

TABLE 10

Characteristics of the products obtained in Example 7

| Moisture content (%) | Dry granul. <44 μm (%) | Damp granul. <44 μm (%) | Damp granul. <5 μm (%) | Viscosity in water saturated with NaCl (cP) |
|---|---|---|---|---|
| 11.4 | 33.0 | 95.0 | 88.0 | 16,600 |

EXAMPLE 8

An attapulgite mineral with an attapulgite purity of 75% and a moisture content of 22% is ground to a particle size with 47% less than 44 microns and 89% less than 150 microns.

53.1 parts by weight of this ground attapulgite are then mixed with 46.9 parts by weight of water to which has previously been added 0.45 parts by weight of tetrasodium pyrophosphate (TSPP). The paste formed is mixed in a Lödige type turbomixer for 6 minutes.

The paste formed, which has an attapulgite concentration of 45%, is fed to a flash dryer where it is dried, ground and sorted until a product is obtained with a granulometry when dry with 30% less than 44 microns and with a granulometry when damp, once dispersed in water, with 95% less than 44 microns and 90% less than 5 microns.

The final product obtained is dispersed in a 6% concentration of water saturated with NaCl.

The characteristics of the product obtained are shown in Table 11.

TABLE 11

Characteristics of the products obtained in Example 8

| Moisture content (%) | Dry granul. <44 μm (%) | Damp granul. <44 μm (%) | Damp granul. <5 μm (%) | Viscosity in water saturated with NaCl (cP) |
|---|---|---|---|---|
| 10.0 | 30 | 95.0 | 90.0 | 18,200 |

EXAMPLE 9

A sepiolite mineral with a sepiolite purity of 85% and a moisture content of 33% is ground to a particle size with 95% less than 150 microns and 30% less than 44 microns.

52.5 parts by weight of this ground sepiolite are then mixed with 47.4 parts by weight of water to which has previously been added 0.52 parts of tetrasodium pyrophosphate (TSPP) and 0.7 parts of a 50% solution of NaOH. The resulting composition, with a sepiolite concentration of 35%, is mixed for 30 minutes in a Lödige type turbomixer. The pulp thus obtained has a Brookfield viscosity at 5 rpm of 6,720 cP and a pH of 11.7, it is fluid, manageable and does not display any sedimentation nor release of water.

17 parts of this pulp with a sepiolite concentration of 35% is mixed with 83 parts of a saturated solution of NaCl with which the final sepiolite concentration is 6%. The resulting viscosity is 47,800 cP, which shows that the sepiolite pulp obtained in this example has a thickening capacity when added to high ionic force systems.

The pulp with a sepiolite concentration of 35% obtained in this example was used as a rheological additive for consistency recovery in a standardised mortar, to which 20% excess of water was added, with the consistency being measured by means of a shaking table for the standardised mortar, for mortar with excess of water and for mortar with excess of water and the addition of 0.6% of the product of example 9.

TABLE 12

Characteristics and composition of the mortar obtained

| Standardised mortar (52.5 cement) | (pp) | 1,000 | 1,000 | 1,000 |
|---|---|---|---|---|
| Water | (pp) | 125 | 150 | 150 |
| Excess water | (%) | 0 | 20 | 20 |
| Pulp example 9 | (% of the weight of mortar) | — | — | 0.6 |
| Dose rate of pulp example 9 | (L pulp/ m³ of mortar) | — | — | 10.5 |
| Dry base sepiolite incorporated | (% sepiolite over mortar) | — | — | 0.18 |
| Total excess of water | (pp) | — | 20.0 | 23.8 |
| Consistency | (mm) | 170 | 205 | 165 |
| Segregation of water (initial) | (Yes/No) | No | Yes | No |
| Segregation of water (at 10 min) | (Yes/No) | No | Yes | No |

The addition of the pulp of example 9 permits the consistency of the standardised mortar to be recovered, using a dose rate of 10.5 litres per m³ of mortar, which indicates a high degree of efficiency for consistency recovery. In spite of the 20% of excess water which has been incorporated, the mortar did not exude.

EXAMPLE 10

A sepiolite mineral with a sepiolite purity of 85% and a moisture content of 30% is ground to a particle size with 95% less than 150 microns and 30% less than 44 microns.

35.8 parts by weight of this ground sepiolite are then mixed with 64.1 parts by weight of water to which 0.5 parts of Dequest 2016 (supplied by Degussa) and 0.65 parts of a 50% solution of NaOH have previously been added. The resulting mixture, with a sepiolite concentration of 25%, is mixed for 30 minutes in a Lödige type turbomixer. The Brookfield viscosity at 5 rpm of the final pulp is 2,750 cP and the pH is 12.33. The pulp is fluid and does not display any sedimentation. The pulp obtained in this example was used as a rheological additive for consistency recovery in a standardised mortar, to which 10% excess of water was added. Table 13 shows the consistency, determined with a shaking table, of the standardised mortar, the mortar with excess of water and the mortar with excess of water and the addition of 0.3% of the pulp of example 10.

TABLE 13

Characteristics and composition of the mortar obtained

| Standardised mortar (52.5 cement) | (pp) | 1,000 | 1,000 | 1,000 |
|---|---|---|---|---|
| Water | (pp) | 125 | 150 | 150 |
| Excess water | (%) | 0 | 10 | 10 |
| Pulp example 10 | (pp) | — | — | 0.3 |
| Dose rate of pulp example 10 | (L pulp/ m³ of mortar) | — | — | 6.4 |
| Consistency | (mm) | 150 | 205 | 150 |
| Segregation of water | (Yes/No) | No | Yes | No |

The addition of the pulp of example 10 permits the consistency of the standardised mortar to be recovered when there is a 10% excess of water, using a dose rate of 6.4 litres per m³ of mortar, which indicates a high degree of efficiency for consistency recovery. In spite of the excess water which has been incorporated, the mortar did not exude.

While the invention has been described and illustrated herein by reference to the specific embodiments, various specific materials, procedures and examples, it is understood that the invention is not restricted to the particular materials, combinations of materials, and procedures selected for that purpose. Indeed, various modifications of the invention in addition to those described herein will become apparent to those skilled in the art from the foregoing description and the accompanying figures. Such modifications are intended to fall within the scope of the appended claims.

The invention claimed is:

1. A method for preparing a rheological product of sepiolite in which sepiolite mineral is wet ground, wherein the procedure comprises a first stage consisting of grinding sepiolite mineral, with a sepiolite content of at least 50%, and with a moisture content of less than 40% to a particle size of less than 1 mm, in order to obtain ground sepiolite mineral;

a second stage consisting of mixing the ground sepiolite mineral with an aqueous solution of a dispersing component consisting of a dispersing agent corresponding to a base selected from the group consisting of sodium hydroxide, ammonium hydroxide and potassium hydroxide capable of increasing the pH of the mixture to above pH 9, in such a way that the final water content is between 35% and 65% and the content of dispersing component is between 0.1% and 7% of the weight of the sepiolite mineral, in order to obtain a first mixture consisting of sepiolite mineral, dispersant component and water;

a third stage consisting of mixing the first mixture obtained in the second stage as far as deagglomerating the microfibre bundles of the sepiolite using an intensive mixer or a turbomixer, in order to obtain the rheological product in the form of a paste in a dispersion homogeneously mixed with the dispersant and the water, and which comprises 0.1-7% by weight referring to the sepilolite mineral, of the dispersing component;

35-65% by weight referring to the total weight, of rheological product and water, in the absence of a flocculant;

and a fourth stage which consists of drying the paste obtained in the third stage in order to obtain a dry material with a moisture content of less than 20%, grinding the dry material and sorting the ground dry material.

2. A method according to claim 1, wherein at the fourth stage the paste obtained in the third stage is dried ground and sorted in order to obtain a sepiolite rheological product with a moisture content of less than 20% and with a damp granulometry, once dispersed in water, of less than 250 µm.

3. A method according to claim 1, wherein the dispersing component is added in a percentage between 0.3% and 2% of the weight of the sepiolite mineral.

4. A method according to claim 1, wherein the third stage, the first mixture is mixed for at least 5 minutes.

5. A method according to claim 1, wherein the mixing time in the third stage is from 5 to 30 minutes.

6. A method according to claim 1, wherein the fourth stage is carried out using flash drying equipment.

7. A method according to claim 1, wherein the drying, grinding and sorting in the fourth stage is done in a single step using "flash" drying equipment.

8. A method according to claim 6, wherein the drying equipment is a Micron Flash Dryer.

9. A method for preparing a rheological product of sepiolite in which sepiolite mineral is wet ground, wherein the procedure comprises a first stage consisting of grinding sepiolite mineral, with a sepiolite content of at least 50%, and with a moisture content of less than 40% to a particle size of less than 1 mm, in order to obtain ground sepiolite mineral;

a second stage consisting of mixing the ground sepiolite mineral with an aqueous solution of a dispersing component consisting of a first dispersing agent corresponding to a base capable of increasing the pH of the mixture to above pH 9 selected from among the group formed from sodium hydroxide, ammonium hydroxide and potassium hydroxide, and a second dispersing agent selected from among inorganic polyelectrolytes, in such a way that the final water content is between 35% and 65% and the content of dispersing component is between 0.1% and 7% of the weight of the sepiolite mineral, in order to obtain a first mixture consisting of sepiolite mineral, dispersant component and water;

a third stage consisting of mixing the first mixture obtained in the second stage as far as deagglomerating the microfibre bundles of the sepiolite using an intensive mixer or a turbomixer, in order to obtain the rheological product in the form of a paste in a dispersion homogeneously mixed with the dispersant and the water, and which comprises 0.1-7% by weight referring to the sepilolite mineral, of the dispersing component;

35-65% by weight referring to the total weight, of rheological product;

and water, in the absence of a flocculant;

and a fourth stage which consists of drying the paste obtained in the third stage in order to obtain a dry material with a moisture content of less than 20%, grinding the dry material and sorting the ground dry material.

10. A method according to claim 9, wherein the inorganic polyelectrolyte is selected from the group consisting of polyphosphoric acids, alkaline salts of polyphosphoric acids, mixtures and derivatives of phosphonic acids and phosphinic acids, salts derived from phosphonic acids and phosphinic acids and mixtures thereof 11. A method according to claim 10, wherein the inorganic polyelectrolyte is selected from the group consisting of hexametaphosphoric acid, tripolyphosphoric acid, pyrophosphoric acid, polysilicic acid and salts of these acids, 1-hydroxyethyl-1,1-diphosphonic acid and its salts, ethylene diamine tetra(methylenephosphonic) acid and its salts, hexamethylene diamine tetra(methylenephosphonic) acid and its salts, diethylene triamine penta(methylenephosphonic) acid and its salts, and combinations thereof 12. A method according to claim 9, wherein at the fourth stage the paste obtained in the third stage is dried, ground and sorted in order to obtain a sepiolite rheological product with a moisture content of less than 20% and with a damp granulometry, once dispersed in water, of less than 250 µm.

13. A method according to claim 9, wherein in the third stage, the first mixture is mixed for at least 5 minutes.

14. A method according to claim 9, wherein the mixing time in the third stage is from 5 to 30 minutes.

15. A method according to claim 9, wherein the fourth stage is carried out using flash drying equipment.

16. A method according to claim 9, wherein the drying, grinding and sorting in the fourth stage is done in a single step using "flash" drying equipment.

17. A method according to claim 15, wherein the drying equipment is a Micron Flash Dryer.

\* \* \* \* \*